Nov. 19, 1946.  A. V. FROHNAPEL  2,411,419
REFRIGERATING APPARATUS
Filed Jan. 26, 1945  2 Sheets-Sheet 1
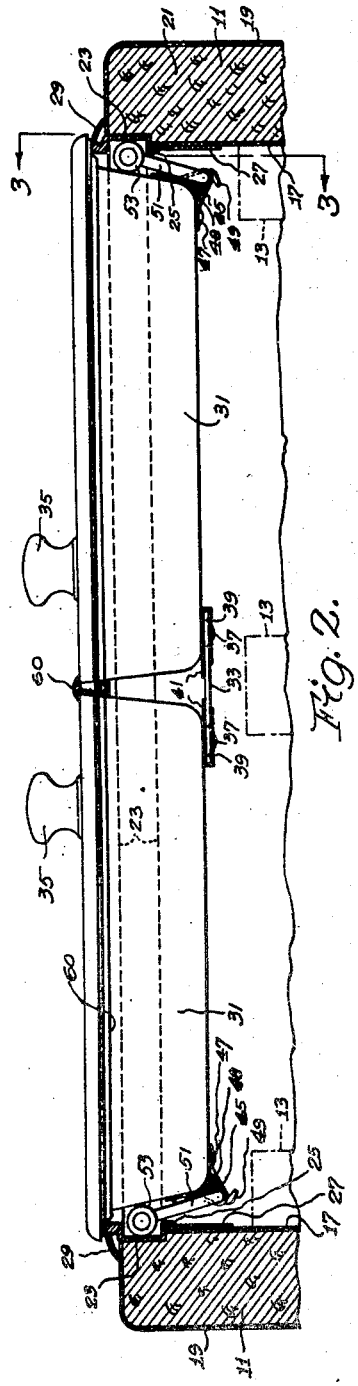
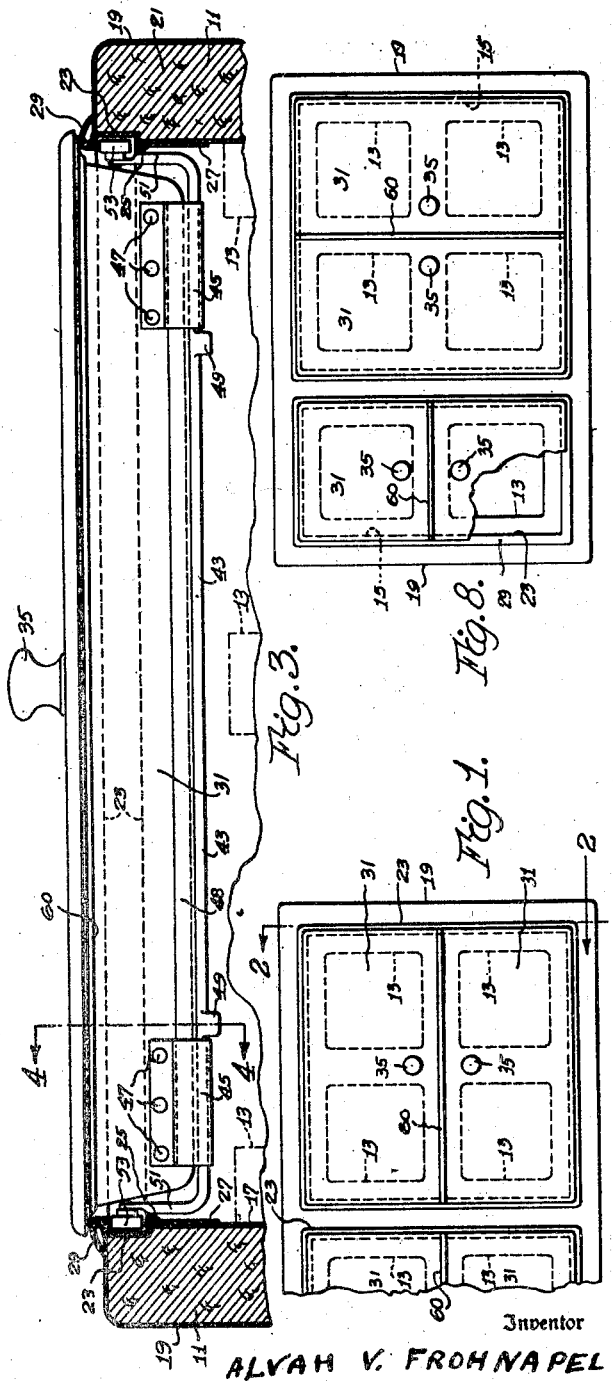
Inventor
ALVAH V. FROHNAPEL
Ralph E. Baker
Attorney

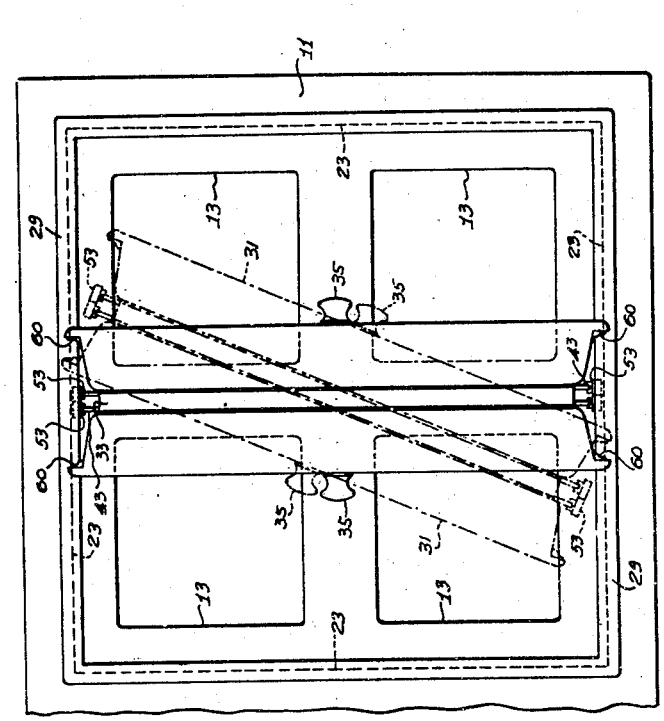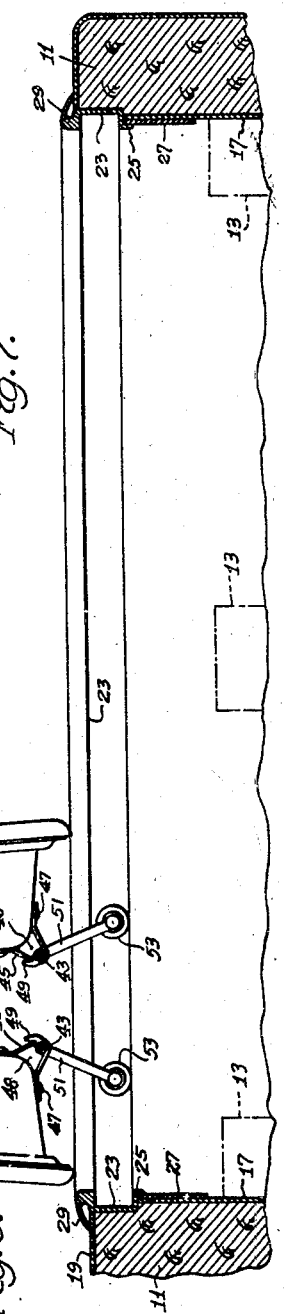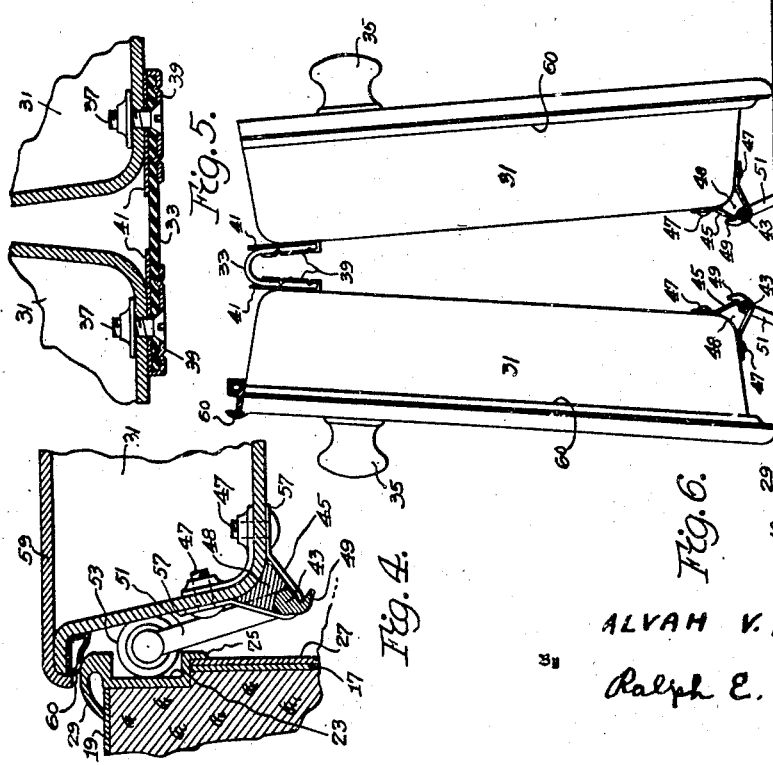

Patented Nov. 19, 1946

2,411,419

UNITED STATES PATENT OFFICE 2,411,419

REFRIGERATING APPARATUS

Alvah V. Frohnapel, Grand Rapids, Mich., assignor to Nash-Kelvinator Corporation, Detroit, Mich., a corporation of Maryland Application January 26, 1945, Serial No. 574,779

4 Claims. (Cl. 160—187)

My invention pertains to ice cream dispensing apparatus, and more particularly to an improved cover arrangement for ice cream dispensing cabinets.

Ice cream dispensing cabinets have been provided with various arrangements of lids which though convenient are unsatisfactory because the lids are often entirely removed and put aside during rush hours, exposing the ice cream to heat, foreign matter and contamination.

It is accordingly an object of my invention to provide an improved cover arrangement for ice cream cabinets which will remain secured upon the cabinet while providing convenient access to any of the desired storage compartments therein.

It is also an object of my invention to provide an improved ice cream cabinet cover arrangement which may be quickly and conveniently folded up and pushed back to provide free access to any desired storage compartment of a two compartment cabinet or to any two compartments simultaneously in a four compartment cabinet, such cover being arranged so that it may be folded to the right or to the left of the cabinet, as desired, or said cover may be placed on the cabinet so that it will be folded by moving to the front or to the rear of the cabinet, as desired.

Further objects and advantages are within the scope of the invention, such as relate to the arrangement, operation and function of the related elements of the structure, to various details of construction and to combination of parts, elements, per se, and to economies of manufacture and numerous other features as will be apparent from a consideration of the specification in conjunction with the drawings disclosing specific embodiments of the invention, in which:

Fig. 1 is a plan view showing an ice cream dispensing cabinet provided with covers in accordance with my invention, and partially broken away;

Fig. 2 is an enlarged cross-sectional view through the cabinet, as represented by line 2—2 in Fig. 1, showing a side elevational view of the covers;

Fig. 3 is a cross-sectional view taken at ninety degrees from that of Fig. 2, as represented by line 3—3 of Fig. 2;

Fig. 4 is an enlarged fragmentary sectional view taken on line 4—4 in Fig. 3;

Fig. 5 is an enlarged fragmentary detail view across the hinge means between the bottom surfaces of the two cover panels;

Fig. 6 is a view similar to Fig. 2 but showing the two cover panels folded up together and pushed back as in operation for access to the adjacent compartments;

Fig. 7 is a plan view showing how the folded cover panels may be moved to an intermediate position and released from the cabinet by rotating to a diagonal position, shown dotted; and Fig. 8 is a plan view showing how the released covers may then be reinstalled for operation at a right angular position relative to the first installation shown.

Referring more specifically to Figs. 1 and 2, a thermally insulated, ice cream dispensing cabinet 11 is shown enclosing a plurality of storage compartments 13 suitable for receiving cans of ice cream (not shown) of various flavors in a well known manner. As usual in such cabinets, a top opening 15 provides convenient access to the compartments for dispensing ice cream, and the side walls comprise an inner liner 17 and an outer liner 19 confining suitable thermal insulating material 21 therebetween.

In accordance with my invention, a guide rail 23 is disposed along and parallel to the upper edge of the opening 15. The guide rail 23 is channel shaped in cross-section and from the inside lower edge of the rail a flange 25 extends down overlapping a breaker strip 27 of Bakelite, or other suitable material, which joins with the inner liner. From the upper side of the guide rail 23 a flange 29 extends upwardly and outwardly for overlapping and connecting with the upper portion of the outer liner. Where the cabinet encloses four storage compartments 13 grouped in a compact arrangement so that each compartment is adjacent to two other compartments, as shown in Fig. 1, the top opening 15 may be rectangular or substantially square and four of the guide rails 23 are provided extending in end-to-end relation all around the opening with the channel cross-sections opening inwardly, for a purpose to be described.

In accordance with my invention, I cover such a top opening by means of a pair of rectangular cover panels 31 which are joined together in relatively movement relation by hinge means 33 disposed substantially in the plane of the bottom surfaces so that the panels may be raised up in the middle and folded together by lifting up on handle means or knobs 35 on the upper surfaces of the panels adjacent the hinged edges. In Fig. 6, the cover panels 31 are shown folded up together and pushed to one side for access to compartments. While any suitable hinge may be utilized for this purpose I preferably provide hinge means 33 comprising a strip of some flexible material, as shown in detail in Fig. 5, which may be odorless refrigerator rubber, secured along each edge to the under side of one of the panels 31 by means of screws 37 passing into the panels through clamping plates 39. Reinforcing plates 41 may be placed between the flexible strip and the bottom surfaces of the panels for extending further into the intervening space between the rounded lower inner corner edges of the panels.

Suitable guide means project from the outer ends of the two panels for engaging into the guide rails 23 to secure the panels to the cabinet and smoothly guide the movements of the panels in folding up and down, as ice cream is dispensed from the respective storage compartments. For this purpose I preferably provide two guide bars 43 of lengths substantially equal to the width across the ends of the panels, and to the outer ends of which the bars are pivotally secured by means of a pair of clamping clamps 45 which, as may be seen in Figs. 3 and 4, are secured to the lower corners of the panels in spaced relation by means of screws 47. An elongated spacer 48 is provided which extends between each pair of clamps 45 by which the ends are secured. The spacers 48 serve to space the pivoted guide bars or axles 43 away from the corners of the cover panels and also serve to engage a limit stop 49 on each shaft or bar 43 for limiting the rotation of the guide bars. Each guide bar 43 is provided on the two ends with a crank 51 bent in L relation to the bar and each such crank has a guide means 53 extending axially outward for interlocking engagement into the guide rails to hold the cover panels upon the cabinets. Such axial guide projections 53 may be a pin made of a size to slide snugly along in the channel of the guide rails, but it preferably serves as a pin for rotatively supporting a friction reducing roller of a diameter suitable for free movement in the guide rail. The cover panels 31 may be made of plastic composition, as shown in Fig. 4, and may comprise an inwardly dished body member 57 closed by an outer member 59 between which any suitable thermal insulation material may be packed, as will be readily understood. A flexible rubber gasket 60 may be provided for sealing engagement between the upper flange 29 of the guide rail and an outwardly turned flange of the panel, and such a gasket may also be provided for sealing between the two adjacent hinged edges of the panels, as shown in Fig. 2.

Fig. 6 shows how the two hinged cover panels 31 fold up together, when lifted by the handles, so that by pushing the folded panels to one side the two compartments adjacent to the attendant are made conveniently accessible. In this position the cranks 51 of the two axle bars 43 are swung out and down relatively to the panels for securing these to the cabinet. Also, as the panels approach a close folded relation, the limit stops 49 on the axles strike the spacer 48 and hold the guide projection rollers 53 rather rigidly as these approach close together. To remove the covers from the cabinet while in folded together relation, these are moved toward the middle of the cabinet and then turned toward a diagonal position, as represented dotted in Fig. 7, thus releasing the rollers 53 from the guide rails 23. By turning the folded covers to a complete ninety degree relation to the original position, and reversing the process, the guide rollers 53 may be inserted into the other two guide rails 23, and the cover panels 31 may then be opened to cover the cabinet, as shown in Fig. 8. Access is then provided simultaneously to the two compartments 13 on one side, or the other two compartments on the other side of the cabinet, each time the covers are folded up and back. In other words, the compartments 13 are now available in different pairs than with the covers on the cabinet in the original position.

The two cover panels 31 may be made of suitable sizes and shapes for covering only two storage compartments 13, one under each panel, as shown at the left hand end of Fig. 8. In this arrangement, it is only necessary to provide two guide rails 23, one along each of the long sides of the top opening in the cabinet, in order to smoothly guide the cover panels in the movements of folding up and back to afford access to either compartments in the same manner as previously disclosed. Similarly, the cover arrangement may be detached and removed from the cabinet by folding the cover panels 31 up together in a mid-position and turning to a diagonal position, as shown dotted in Fig. 7.

Although I have shown and described certain specific embodiments of my invention, I am fully aware that many modifications thereof are possible. My invention, therefore, is not to be restricted except insofar as necessitated by the prior art.

I claim:

1. A roll-back cover for ice cream cabinets comprising, a pair of cover panels, hinge means substantially in the plane of the lower surfaces of said panels joining said panels in a relatively movable relation with one edge of each panel adjacent to one edge of the other panel, handle means on the upper sides of said panels adjacent the hingedly joined edges for simultaneously lifting these edges of the panels and causing the two panels to fold together with the outer edges adjacently disposed.

2. Ice cream dispensing apparatus comprising, a thermally insulating cabinet having a substantially rectangular top opening for providing convenient access to a plurality of enclosed storage compartments, guide means disposed along and substantially parallel to the edges of said top opening, a pair of rectangular cover panels, hinge means substantially in the plane of the lower surface of said panels joining said paneds in a relatively movable relation with one edge of each panel adjacent to one edge of the other panel, handle means on the upper sides of said panels adjacent the hingedly joined edges for lifting the panels and causing the two panels to fold together with the outer edges adjacently disposed, and guide means projecting from the outer edges of said panels remote from the joined edges for interlocking engagement with the guide means on the cabinet.

3. In ice cream dispensing apparatus the combination of, a thermally insulating cabinet having a substantially rectangular top opening for providing convenient access to a plurality of enclosed storage compartments, guide rails disposed along and substantially parallel to the edges of said top opening, said guide rails being of a substantially channel cross-section in shape, the open sides of said guide rails opening inwardly toward each other, a pair of rectangular cover panels, hinge means substantially in the plane of the lower surfaces of said panels for joining them in a relatively movable relation with two of the edges adjacently disposed, handle means on the upper sides of the panels for lifting and folding them with the outer unhinged edges folding together, and guide means projecting from the outer edges of said panels remote from the hinged edges and extending into the channel cross-section guide rails for guiding and securing the panels as they move toward open and closed positions.

4. Refrigerating apparatus comprising, a cabinet having an opening at the top thereof for providing access to a plurality of storage compartments, a guide rail disposed along and substantially parallel to edges of the top opening, a pair of panels adapted to cover said opening, hinge means joining said panels to permit said panels to fold up together along the hinged edges thereof, guide means carried by said panels and cooperating with said guide rails on two sides of the cabinet whereby said panels may be folded up together to gain access to all compartments simultaneously, or moved laterally to gain access to only certain of said compartments, said guide means carried by said panels removably cooperating with said guide rails to permit removing of said panels and guide means from the rails on said two sides of the cabinet and repositioning them for cooperation with the guide rails on the other two sides of the cabinet whereby the panels may be folded and unfolded in a direction ninety degrees from said first direction.

ALVAH V. FROHNAPEL.